(12) United States Patent
Heidarizad et al.

(10) Patent No.: US 10,745,294 B2
(45) Date of Patent: Aug. 18, 2020

(54) GRAPHENE OXIDE/MAGNESIUM OXIDE NANOCOMPOSITES AS SUPERIOR SORBENTS FOR METHYLENE BLUE REMOVAL FROM AQUEOUS SOLUTIONS

(71) Applicant: Southern Methodist University, Dallas, TX (US)

(72) Inventors: Mahdi Heidarizad, Dallas, TX (US); S. Sevinç Sengör, Dallas, TX (US)

(73) Assignee: SOUTHERN METHODIST UNIVERSITY, Dallas, TX (US)

( * ) Notice: Subject to any disclaimer, the term of this patent is extended or adjusted under 35 U.S.C. 154(b) by 288 days.

(21) Appl. No.: 15/630,652

(22) Filed: Jun. 22, 2017

(65) Prior Publication Data

US 2017/0369333 A1    Dec. 28, 2017

Related U.S. Application Data

(60) Provisional application No. 62/353,862, filed on Jun. 23, 2016.

(51) Int. Cl.
| | |
|---|---|
| *C02F 1/28* | (2006.01) |
| *B01J 20/20* | (2006.01) |
| *B01J 20/04* | (2006.01) |
| *B01J 20/32* | (2006.01) |
| *B01J 20/28* | (2006.01) |
| *C02F 101/30* | (2006.01) |

(52) U.S. Cl.
CPC ............ *C02F 1/288* (2013.01); *B01J 20/041* (2013.01); *B01J 20/205* (2013.01); *B01J 20/28007* (2013.01); *B01J 20/324* (2013.01); *B01J 20/3204* (2013.01); *B01J 20/3236* (2013.01); *C02F 2101/308* (2013.01); *C02F 2303/16* (2013.01); *C02F 2305/08* (2013.01); *Y02W 10/37* (2015.05)

(58) Field of Classification Search
CPC .... C02F 1/281; C02F 1/288; C02F 2101/308; C02F 2303/16; C02F 2305/08; B01J 20/041; B01J 20/324; B01J 20/3236; B01J 20/3204; B01J 20/28007; B01J 20/205

See application file for complete search history.

(56) References Cited

U.S. PATENT DOCUMENTS

| | | |
|---|---|---|
| 9,156,021 B2 | 10/2015 | Salam et al. |
| 2013/0098833 A1 | 4/2013 | Sun et al. |
| 2015/0183189 A1 | 7/2015 | Kim et al. |

FOREIGN PATENT DOCUMENTS

CN        105817211 A    *    8/2016

OTHER PUBLICATIONS

Lee et al, Growth of magnesium oxide nanoparticles onto graphene oxide nanosheets by sol-gel process, Oct. 2013, Carbon Letters, vol. 14, No. 4, pp. 206-209). (Year: 2013).*

(Continued)

*Primary Examiner* — Matthew O Savage
(74) *Attorney, Agent, or Firm* — Edwin S. Flores; Chalker Flores, LLP (57) ABSTRACT

The present invention includes a composition, method of making and method of using a composite for the removal of waste from a wastewater or a waste stream wherein the composite comprises of graphene oxide and magnesium oxide nanoparticles at a ratio of 10:1 to 1:10 weight to weight.

7 Claims, 6 Drawing Sheets

(56) References Cited

OTHER PUBLICATIONS

Lee et al, Magnesium hydroxide nanoplates/graphene oxide composites as efficient adsorbents for organic dyes, Sep. 2015, RSC Advances, Issue 102, 23 pages. (Year: 2015).*

Ai, L., et al., "Removal of methylene blue from aqueous solution by a solvothermal-synthesized graphene/magnetite composite" J. Hazard. Mater. 192, Jul. 1, 2011, pp. 1515-1524.

Al-Degs, Y.S., et al., "Effect of solution pH, ionic strength, and temperature on adsorption behavior of reactive dyes on activated carbon," Dyes Pigments 77, Mar. 12, 2007, pp. 16-23.

Allen, M.J., et al., "Honeycomb Carbon: A Review of Graphene," Chem. Rev. 110, Jul. 17, 2009, pp. 132-145.

Apul, O.G., et al., "Adsorption of aromatic organic contaminants by graphene nanosheets: Comparison with carbon nanotubes and activated carbon," Dec. 28, 2012, Water Res. vol. 47, 1648-1654.

Azar, M.T., et al., "A comparative study for the removal of aniline from aqueous solutions using modified bentonite and activated carbon," Desalination Water Treatment, Jan. 22, 2016, www.tandfonline.com/loi/tdwt20, 15 pp.

Banerjee, P., et al., "Optimization and modelling of synthetic azo dye wastewater treatment using Graphene oxide nanoplatelets: Characterization toxicity evaluation and optimization using Artificial Neural Network," Ecotoxicol. Environ. Saf. 119, May 14, 2015, pp. 47-57.

Becerril, H.A., et al., "Evaluation of Solution-Processed Reduced Graphene Oxide Films as Transparent Conductors," ACS Nano 2, Feb. 9, 2008, pp. 463-470.

Behnamfard, A., et al., "Equilibrium and kinetic studies on free cyanide adsorption from aqueous solution by activated carbon," J. Hazard. Mater. 170, May 5, 2009, pp. 127-133.

Deng, J.-H., et al., "Simultaneous removal of Cd(II) and ionic dyes from aqueous solution using magnetic graphene oxide nanocomposite as an adsorbent," Chem. Eng. J. 226, Apr. 20, 2013, pp. 189-200.

Fan, L., et al., "Fabrication of novel magnetic chitosan grafted with graphene oxide to enhance adsorption properties for methyl blue," J. Hazard. Mater. 215-216, Mar. 3, 2012, pp. 272-279.

Gómez-Pastora, J., et al., "Recent progress and future challenges on the use of high performance magnetic nano-adsorbents in environmental applications," Chem. Eng. J. vol. 256, Jul. 11, 2014, pp. 187-204.

Hamadanian, M., et al., "Electrospun titanium dioxide nanofibers: Fabrication, properties and its application in photo-oxidative degradation of methyl orange (MO)," Fibers Polym. vol. 12, No. 7, Jun. 15, 2011, pp. 880-885.

Hamadanian, M., et al., "Preparation of novel hetero-nanostructures and high efficient visible light-active photocatalyst using incorporation of CNT as an electron-transfer channel into the support TiO2 and PbS," J. Taiwan Inst. Chem. Eng. vol. 44, Mar. 16, 2013, pp. 748-757.

Jiang, G., et al., "TiO2 nanoparticles assembled on graphene oxide nanosheets with high photocatalytic activity for removal of pollutants," Carbon vol. 49, Feb. 26, 2011, pp. 2693-2701.

Kumar, A., et al., "On the synthesis and optical absorption studies of nano-size magnesium oxide powder," J. Phys. Chem. Solids vol. 69, Jun. 30, 2008, pp. 2764-2772.

Li, B., et al., "Mg(OH)2@reduced graphene oxide composite for removal of dyes from water," J. Mater. Chem. vol. 21, Jul. 27, 2011, pp. 13765-13768.

Li, L.-X., et al., "Excellent fluoride removal properties of porous hollow MgO microspheres," New J Chem vol. 38, Aug. 31, 2014, pp. 5445-5452.

Liu, M., et al., "Synthesis and adsorption performance of Mg(OH)2 hexagonal nanosheet-graphene oxide composites," Appl. Surf. Sci., vol. 332, Jan. 24, 2015, pp. 121-129.

Ma, J., et al., "Intercalated methylene blue between calcium niobate nanosheets by ESD technique for electrocatalytic oxidation of ascorbic acid," Microporous Mesoporous Mater. vol. 221, Sep. 30, 2015, pp. 123-127.

Mishakov, I.V., et al., "Nanocrystalline MgO as a Dehydrohalogenation Catalyst," J. Catal. vol. 206, Nov. 21, 2001, pp. 40-48.

Moussavi, G., et al., "High-rate adsorption of acetaminophen from the contaminated water onto double-oxidized graphene oxide," Chem. Eng. J. vol. 287, Dec. 2, 2015, pp. 665-673.

Moussavi, G., et al., "The integration of ozonation catalyzed with MgO nanocrystals and the biodegradation for the removal of phenol from saline wastewater," Appl. Catal. B Environ. vol. 97, Apr. 2, 2010, pp. 160-167.

Moussavi, G., et al., "Removal of azo and anthraquinone reactive dyes from industrial wastewaters using MgO nanoparticles," J. Hazard. Mater. vol. 168, Feb. 25, 2009, pp. 806-812.

Moussavi, G., et al., "Degradation and biodegradability improvement of the reactive red 198 azo dye using catalytic ozonation with MgO nanocrystals," Chem. Eng. J. vol. 152, Mar. 5, 2009, pp. 1-7.

Moussavi, G., et al., "The removal of formaldehyde from concentrated synthetic wastewater using O3/MgO/H2O2 process integrated with the biological treatment," J. Hazard. Mater. vol. 171, Jun. 23, 2009, pp. 907-913.

Qu, X., et al., "Nanotechnology for a Safe and Sustainable Water Supply: Enabling Integrated Water Treatment and Reuse," Acc. Chem. Res. vol. 46, No. 3, Jun. 27, 2012, pp. 834-843.

Rafatullah, M., et al., "Adsorption of methylene blue on low-cost adsorbents: A review," J. Hazard. Mater. vol. 177, Dec. 14, 2009, pp. 70-80.

Ramesha, G.K., et al., "Graphene and graphene oxide as effective adsorbents toward anionic and cationic dyes," J. Colloid Interface Sci. vol. 361, May 24, 2011, pp. 270-277.

Robinson, T., et al., "Remediation of dyes in textile effluent: a critical review on current treatment technologies with a proposed alternative," Bioresour. Technol. vol. 77, May 29, 2000, pp. 247-255.

Roy-Mayhew, J.D., et al., "Functionalized Graphene as a Catalytic Counter Electrode in Dye-Sensitized Solar Cells," ACS Nano vol. 4, No. 10, Oct. 12, 2010, pp. 6203-6211.

Schwierz, F., "Graphene transistors," Nat. Nanotechnol. vol. 5, Jul. 2010, pp. 487-496.

Sharma, P., et al., "Removal of methyl green dye molecule from aqueous system using reduced graphene oxide as an efficient adsorbent: Kinetics, isotherm and thermodynamic parameters," Colloids Surf. Physicochem. Eng. Asp. vol. 457, Jun. 2, 2014, pp. 125-133.

Tang, Y., et al., "Synthesis of reduced graphene oxide/magnetite composites and investigation of their adsorption performance of fluoroquinolone antibiotics," Colloids Surf. Physicochem. Eng. Asp. vol. 424, Feb. 27, 2013, pp. 74-80.

Tavakoli, M.M., et al., "Physicochemical properties of hybrid graphene-lead sulfide quantum dots prepared by supercritical ethanol," J. Nanoparticle Res. vol. 17:9, Jan. 11, 2015, pp. 1-13.

Tayyebi, A., et al., "Synthesis and characterization of ultrasound assisted "graphene oxide-magnetite" hybrid, and investigation of its adsorption properties for Sr(II) and Co(II) ions," Appl. Surf. Sci. vol. 353, Jun. 23, 2015, pp. 350-362.

Tayyebi, A., et al., "Supercritical Synthesis and Characterization of Graphene-PbS Quantum Dots Composite with Enhanced Photovoltaic Properties," Ind. Eng. Chem. Res. vol. 54, Jul. 6, 2015, pp. 7382-7392.

Tiwari, J.N., et al., "Reduced graphene oxide-based hydrogels for the efficient capture of dye pollutants from aqueous solutions," Carbon vol. 56, Jan. 10, 2013, pp. 173-182.

Toor, M., et al., "Adsorption characteristics, isotherm, kinetics, and diffusion of modified natural bentonite for removing diazo dye," Chem. Eng. J. vol. 187, Jan. 19, 2012, pp. 79-88.

Van der Zee, F.P., et al., "Combined anaerobic-aerobic treatment of azo dyes—A short review of bioreactor studies," Water Res. vol. 39, Feb. 23, 2015, pp. 1425-1440.

Wang, C., et al., "Preparation of a graphene-based magnetic nanocomposite for the removal of an organic dye from aqueous solution," Chem. Eng. J. vol. 173, Jul. 20, 2011, pp. 92-97.

Wang, S., et al., "Adsorptive remediation of environmental pollutants using novel graphene-based nanomaterials," Chem. Eng. J. vol. 226, Apr. 23, 2013, pp. 336-347.

(56) References Cited

OTHER PUBLICATIONS

Wu, T., et al., "Adsorption characteristics of acrylonitrile, p-toluenesulfonic acid, 1-naphthalenesulfonic acid and methyl blue on graphene in aqueous solutions," Chem. Eng. J. vol. 173, Jul. 20, 2011, pp. 144-149.

Wu, Y., et al., "Adsorption of hexavalent chromium from aqueous solutions by graphene modified with cetyltrimethylammonium bromide," J. Colloid Interface Sci. vol. 394, Dec. 5, 2012, pp. 183-191.

Yang, S.-T., et al., "Removal of methylene blue from aqueous solution by graphene oxide," J. Colloid Interface Sci. vol. 359, Mar. 6, 2011, pp. 24-29.

Yang, Z., et al., "Flocculation performance and mechanism of graphene oxide for removal of various contaminants from water," Water Res. vol. 47, Mar. 21, 2013, pp. 3037-3046.

Zhu, J., et al., "One-Pot Synthesis of Magnetic Graphene Nanocomposites Decorated with Core@Double-shell Nanoparticles for Fast Chromium Removal," Environ. Sci. Technol. vol. 46, Nov. 29, 2011, pp. 977-985.

\* cited by examiner

GRAPHENE OXIDE/MAGNESIUM OXIDE NANOCOMPOSITES AS SUPERIOR SORBENTS FOR METHYLENE BLUE REMOVAL FROM AQUEOUS SOLUTIONS

CROSS-REFERENCE TO RELATED APPLICATIONS

This application claims priority to U.S. Provisional Application Ser. No. 62/353,862, filed Jun. 23, 2016, the entire contents of each are incorporated herein by reference.

STATEMENT OF FEDERALLY FUNDED RESEARCH

This invention was made with U.S. Government support under 83614101 awarded by the EPA Office of Research and Development, National Center for Environmental Research. The government has certain rights in this invention.

TECHNICAL FIELD OF THE INVENTION

The present invention relates in general to the field of sorbents for aqueous solutions, and more particularly, to novel graphene oxide/magnesium oxide nanocomposites.

BACKGROUND OF THE INVENTION

Without limiting the scope of the invention, its background is described in connection with wastewater treatment.

Wastewaters generated from industrial activity contain a variety of potentially toxic and environmentally harmful compounds. These compounds present an increasingly serious threat to human and environmental health (Tiwari et al., 2013). Organic dyes are aromatic compounds that are commonly used in various fields of industry, such as textile, pulp and paper, printing, food, plastic, tanneries, etc. (Moussavi and Mahmoudi, 2009a). Because of their high solubility in water, they can easily be transported within the aqueous environment, and may pose many serious ecological, environmental, and health hazards (Moussavi and Mahmoudi, 2009b). Various conventional methods, including physical, chemical, and biological technologies have been proposed for the removal of dyes from wastewater (Hamadanian et al., 2013, 2011; Robinson et al., 2001; van der Zee and Villaverde, 2005). Among the various removal technologies, adsorption is the most commonly used method due to its low cost, simple operation and design requirements, not being influenced by toxic substances and low residual product generation (Rafatullah et al., 2010; Tiwari et al., 2013). Recently, nanomaterials as —new adsorbents— have been investigated for the removal of various pollutions from water and wastewater, such as dyes, heavy metals, antibiotics, microbial pollutants, arsenic, pharmaceuticals, and phenolic compounds (Qu et al., 2013; Tayyebi et al., 2015a; Wang et al., 2013). Compared to more traditional adsorbents, the unique chemical and physical characteristics of the nanomaterials thus provide enhanced removal efficiencies for such contaminants.

U.S. Pat. No. 9,156,021, by Salam, et al., is entitled, "Method and nanocomposite for treating wastewater", and is said to teach a method and nanocomposite for treating wastewater by treating aniline-containing wastewater with a magnetic nanocomposite. Nickel nitrate, iron nitrate and citric acid were dissolved in deionized water to form a metal nitrate and citric acid solution, which was then pH balanced. The pH balanced solution was then heated to form a gel, which is then ignited to form powdered $NiFe_2O_4$, and the nanoparticles were mixed with multi-walled carbon nanotubes to form a magnetic nanocomposite, such that the magnetic nanocomposite includes approximately 75 wt % of the multi-walled carbon nanotubes and approximately 25 wt % of the $NiFe_2O_4$. The magnetic nanocomposite was mixed into a volume of aniline-containing wastewater for adsorption and a magnetic field was applied to magnetically separate the magnetic nanocomposite and the adsorbed aniline from the wastewater.

U.S. Patent Application No. 20150183189, filed by Kim, et al., entitled "Graphene Hydrogel, Graphene Hydrogel Nanocomposite Materials, and Preparation Method Thereof", is said to teach a graphene hydrogel, graphene hydrogel nanocomposite materials, and a preparation method thereof, wherein the graphene hydrogel includes pores between laminated graphene sheets, and the pores contain moisture. In addition, the graphene hydrogel nanocomposite material is said to include nanoparticles and porous pores between laminated graphene sheets, and the pores contain water.

U.S. Patent Application No. 20130098833, filed by Sun, et al., entitled "Method of preparing a nanocomposite membrane and nanocomposite membranes prepared thereof" is said to teach a method of preparing a nanocomposite membrane, comprising: (a) providing a nanocomposite solution comprising a polymer solution and nanomaterials; (b) subjecting the nanocomposite solution to a cold water bath to produce the nanocomposite membrane in a gel-like form; and (c) subjecting the gel nanocomposite membrane to a heat treatment to solidify the nanocomposite membrane, wherein the nanomaterials are dispersed within the polymer matrix of the nanocomposite membrane.

SUMMARY OF THE INVENTION

The present invention includes graphene oxide and magnesium oxide nanocomposite material at a ratio of 10:1 to 1:10 weight to weight, and a preparation method thereof, and a method of using the nanocomposite for the removal of waste from a water solution, wastewater or a waste stream.

In one embodiment, the present invention includes a composition for the removal of waste from a wastewater or a waste stream comprising: a composite comprising graphene oxide and magnesium oxide nanoparticles at a ratio of 10:1 to 1:10 weight to weight. In one aspect, the composition is a nanocomposite. In another aspect, the composite settles in aqueous solutions. In another aspect, the composite removes organic molecules from water. In another aspect, the composite is formed by sonication of a solution of water comprising graphene oxide and magnesium oxide. In another aspect, the composite is impregnated in or on a substrate. In another aspect, the composite is graphene oxide and magnesium oxide nanoparticles and has a ratio of 3:1, 1:1, and 1:3 weight to weight. In another aspect, the composite is graphene oxide and magnesium oxide nanoparticles and has a ratio of 4:1, 1:1, and 1:4 weight to weight. In another aspect, the composite is graphene oxide and magnesium oxide nanoparticles and has a ratio of 5:1 to 1:5.

In another embodiment, the present invention includes a method of removing organic molecules from wastewater or a waste stream in need of removal; and contacting the wastewater or waste stream with a composite of graphene oxide and magnesium oxide nanoparticles for an amount of time sufficient for the organic molecules to attach to the nanoparticles; and separating the nanoparticles from the water. In one aspect, the water is contacted with the wastewater or waste stream in a batch process for 1 to 60 minutes. In another aspect, the water is contacted with the wastewater or waste stream in a batch process for 1 to 20 minutes. In another aspect, at least 90% of the organic molecules are removed in less than 20 minutes. In another aspect the method further comprises the step of removing the organic molecules from the composite, and recycling the composite. In another aspect, the composite is formed by sonication of a solution of water comprising the graphene oxide and magnesium oxide. In another aspect, the composite is impregnated in or on a substrate. In another aspect, the composite is graphene oxide and magnesium oxide nanoparticles and has a ratio of 3:1, 1:1, and 1:3 weight to weight. In another aspect, the composite is graphene oxide and magnesium oxide nanoparticles and has a ratio of 4:1, 1:1, and 1:4 weight to weight. In another aspect, the composite is graphene oxide and magnesium oxide nanoparticles and has a ratio of 5:1 to 1:5. In another aspect, the pH of the wastewater or waste stream is between 6 and 8.

Yet another embodiment of the present invention includes a method of making a composite of graphene oxide and magnesium oxide nanoparticles comprising: resuspending a graphene oxide in water; mixing the graphene oxide in water with magnesium oxide nanoparticles; sonicating the mixture of graphene oxide and magnesium oxide nanoparticles; and removing the water from the mixture of graphene oxide and magnesium oxide nanoparticles to form a composite of graphene oxide and magnesium oxide.

BRIEF DESCRIPTION OF THE DRAWINGS

For a more complete understanding of the features and advantages of the present invention, reference is now made to the detailed description of the invention along with the accompanying figures and in which:

FIGS. 1A to 1E show SEM images: (FIG. 1A) MgO, (FIG. 1B) GO, and GO/MgO NCs for ratios (FIG. 1C) 1:5, (FIG. 1D) 1:1, and (FIG. 1E) 5:1.

FIGS. 3A and 3B show XRD patterns: (FIG. 3A) Graphite and Graphene Oxide, (FIG. 3B) GO/MgO NCs for ratios 1:5, 1:1, and 5:1.

FIGS. 4A and 4B show FTIR spectra: (FIG. 4A) MgO, GO, and GO/MgO NCs before adsorption; (FIG. 4B) MB and GO/MgO NCs after adsorption.

FIGS. 6A to 6G show the removal of MB (20 mg/L) at pH 7 based on: (FIG. 6A) GO/MgO NC dosage after 20 min; (FIG. 6B) contact time; (FIG. 6C) initial MB concentration after 20 min for different ratios of 1:5, 1:1, and 5:1. Illustration of (d) GO being completely dispersed in water;

FIGS. 7A to 7C. Adsorption isotherms of MB on GO/MgO NCs for ratios: (FIG. 7A) 1:5, (FIG. 7B) 1:1, and (FIG. 7C) 5:1 with different pH values of 3, 7 and 11.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In this study, the present inventors synthesized Graphene Oxide/Magnesium oxide nanocomposites (GO/MgO NCs) and demonstrated its application for the successful removal of, e.g., Methylene Blue (MB) dye, from aqueous solutions. The inventors showed that GO/MgO is a successful composition to render the GO to be easily settled in aqueous solutions. The impacts of different study variables on the removal of MB: GO/MgO NC dosage, pH, contact time, and initial MB concentration were investigated. Based on weight, three different ratios of GO/MgO NCs (5:1, 1:1, and 1:5) were synthesized. The results showed that for all GO/MgO ratios, the efficiency of adsorption increased by the increase of GO/MgO NC dosage and almost all of concentrations tested were removed in 20 minutes. GO/MgO NC with 5:1 ratio had the highest capability for removal of MB compared to other ratios. The results showed that the adsorption of MB was mainly occurring onto the GO sites compared to the MgO sites. The adsorption capacity of the NC was greatest for the 5:1 ratio (833 mg/g based on Langmuir adsorption model) compared to other ratios tested in this study, higher than any currently reported graphene based composite adsorbents. This high adsorption capacity shows that GO/MgO NCs are adsorbents for the removal of waste from wastewaters.

The present inventors recognized that new carbonaceous adsorbents have received the most attention due their high adsorption capacity for various adsorbates. Graphene, one of the most interesting advanced carbon-based nanomaterials, is a two dimensional honeycomb $sp^2$ carbon lattice with extraordinary characteristics such as large theoretical surface area (2630 m2/g), good chemical stability, high transparency, giant electron mobility, high thermal conductivity and remarkable elasticity (Allen et al., 2010; Apul et al., 2013; Sharma et al., 2014; Tayyebi et al., 2015b; Wang et al., 2011). Therefore, graphene is a promising material for various applications in different fields such as sensors, transistors, catalysis, and environmental pollution treatment (Jiang et al., 2011; Roy-Mayhew et al., 2010; Schwierz, 2010; Yang et al., 2013). Graphene Oxide (GO), oxidized derivative of graphene, contains epoxide, hydroxyl, and carboxyl groups (Moussavi et al., 2016). These functional groups lead to the negative charge, hydrophilicity and easy dispersion of GO in aqueous solutions (Deng et al., 2013). Hence, GO can be a great candidate to remove different pollutants by adsorption. However, separation of GO from the aqueous solution is an issue after the treatment. Due to this inconvenience, magnetic graphene oxide nanocomposites with iron oxide has been studied by numerous researchers (Gómez-Pastora et al., 2014; Zhu et al., 2012). But, the main disadvantages of these nanocomposites are a necessity of magnetic field for separation, limiting their application in the field.

Further, the inventors recognized that Magnesium oxide (MgO) is an alkaline earth metal oxide with a destructive sorbent, high surface reactivity, high adsorption capacity, and is easy to produce (Mishakov et al., 2002; Moussavi and Mahmoudi, 2009a). Recently, MgO nanoparticles (MgO NPs) have been used for the removal of dyes, catechol, phenol, fluoride, and formaldehyde from wastewater (Li et al., 2014; Moussavi et al., 2010, 2009; Moussavi and Mahmoudi, 2009a, 2009b). Thus, MgO is a hybrid material that easily separates GO from solution.

The present inventors synthesized novel Graphene Oxide/Magnesium oxide nanocomposites (NCs) and demonstrated its application for the successful removal of Methylene Blue (MB) dye from aqueous solutions. The inventors show herein that GO/MgO is a successful composition to render the GO to be easily settled in aqueous solutions and it can be used for the successful removal of organic dyes, using MB as an example. The impacts of different experimental conditions on removal of MB by GO/MgO NCs from aqueous solution were estimated. The mechanism of MB interaction with GO/MgO NCs is also discussed.

Materials. Graphite powder (<20 μm, MW: 12.01) is purchased from Sigma-Aldrich. Magnesium Chloride Hexahydrate ($MgCl_2.6H_2O$), Sulfuric Acid ($H_2SO_4$), Hydrochloric Acid (HCl), Hydrogen Peroxide 30% ($H_2O_2$), Potassium Permanganate ($KMnO_4$), Sodium Nitrate ($NaNO_3$), Sodium Hydroxide Solution (NaOH) and Methylene Blue ($C_{16}H_{18}ClN_3S$) were obtained from Fisher Scientific. All chemicals used in the experiments were analytical grade.

Preparation of GO. The GO is prepared according to the modified Hummers method (Tavakoli et al., 2015). Briefly, 2 g of graphite powder was mixed with 50 ml sulfuric acid (98 wt %) and 2 g sodium nitrate in a 500 mL flask in an ice bath at 0° C. While vigorous stirring, 6 g of potassium permanganate was gradually added to the flask and stirring was maintained for 2 hours. Then, 100 ml of DI water was added to the solution. The solution temperature rapidly increased to 98° C. and was maintained at this temperature for 30 minutes. Then 100 ml deionized (DI) water was added and the temperature increased rapidly to 98° C. and kept for 30 minutes. 300 ml DI water was then added to the flask. Following that, 20 ml hydrogen peroxide (30 wt. %) solution was added, causing the color of the mixture to turn yellow. The mixture was filtered and washed with hydrochloric acid (5%) solution and deionized water several times to eliminate any residuals. Ultimately, GO was synthesized by sonication of the dispersion for 60 min and drying at 60° C.

Preparation of MgO NPs. MgO nanoparticles were synthesized by Sole-gel Method. This method has been successfully used for MgO nanoparticle synthesis and has been proved to be efficient with respect to its simplicity, cost effectiveness and providing unique surface adsorption characteristics (Kumar and Kumar, 2008). In this study, 100 g of magnesium chloride hexahydrate was dissolved in 500 ml of DI water in a 1 L flask, and 50 ml of sodium hydroxide solution (1N) was added. The solution was stirred for 4 h to generate the magnesium hydroxide. The solution was centrifuged used (5000 rpm-7 minutes) to separate the $Mg(OH)_2$ gel from the suspension. $Mg(OH)_2$ gel was washed a few times with DI water and dried at 100° C. for 24 h. Finally, MgO nanoparticles were synthesized by calcination in 550° C. for 2 h.

Preparation of GO/MgO NCs. Three different ratios of GO/MgO NCs (5:1, 1:1, and 1:5) were synthesized by impregnation. Briefly, 0.3 g of GO was added in a beaker with 300 ml DI water and sonicated for 60 min. Different amounts of MgO nanoparticles (NPs) (i.e., 0.06 g, 0.3 g, and 1.5 g) were added to the dispersion beaker. After 30 min of sonication, suspension was collected by centrifuging and dried at 60° C.

Preparation of Methylene Blue (MB) Solution. MB has a molecular weight of 319.85 g/mol. It is water-soluble, which is blue in color (A max 664 nm). A standard solution (1000 mg/L) was prepared by dissolving an accurately weighed amount of MB in a known volume of DI water. The experimental solutions were prepared by diluting the standard solution of MB with DI water to give the appropriate concentration of the desired solutions. The skilled artisan will recognize that MB is a non-limiting example of a water-soluble organic agent that is used to demonstrate the removal of waste from wastewater or wastewater streams.

Characterization. A series of GO/MgO NCs in different ratios (5:1, 1:1, and 1:5) were prepared by sonication method. The surface morphology of the GO, MgO, and GO/MgO was characterized by scanning electron microscopy (SEM) images by Hitachi S-4800 ultra-high-resolution and transmission electron microscopy (TEM) with an ultra high-resolution microscope with an accelerated voltage of 300 kV, a point-to-point resolution of 0.18 nm and a lattice resolution of 0.10 nm. Powder X-ray diffraction (XRD) patterns were obtained by Rigaku Ultima III X-ray diffraction system. The system is configured with a vertical Theta: Theta wide angle goniometer, high intensity Cu x-ray tube (1.54 angstroms wavelength), and a scintillation counter detector. The scans were carried on in 2θ with range of 5° to 80° and 1 second count time per step. Fourier Transform Infrared (FTIR) spectroscopy was used for analysis of chemical bonds from 4000 to 400 $cm^{-1}$ wave number range by using Perkin Elmer Frontier spectrometer at room temperature. X-ray photoelectron spectroscopy (XPS) was performed with PHI5000™ to determine elements contained in prepared powders and their chemical states.

Dye adsorption experiments. The initial and final concentrations of MB solutions were determined by measuring absorbance changes at their respective absorption maxima and sampling at regular intervals, using UV-Visible spectrophotometer (Thermo Scientific, Evolution 201) at the MB maximum adsorption wavelength (664 nm). All dye adsorption experiments were carried out in 125 mL flasks with constant stirring. 100 ml of the 20 mg/L MB solutions were mixed with an appropriate amount of GO/MgO NCs and stirred for defined contact times in an ambient condition (25° C.). The dye removal efficiency (%) at time t is calculated by the following equation:

$$\text{removal}(\%) = \frac{C_0 - C_t}{C_0} \times 100$$

where $C_0$ and $C_t$ are initial and at time t concentrations of MB (mg/L), respectively. The influences of experimental parameters, dosage of powder (0.1-1 g/L), contact time (5-60 minutes), and initial dye concentration (5-100 mg/L)

on the removal of MB were studied in batch mode of operation. All adsorption experiments were run in duplicates and the mean values were reported. The pH of each solution was adjusted by adding diluted $HNO_3$ or NaOH and measured with an Orion 5 Star Series Meter.

Isothermal Study. The adsorption isotherms are used for evaluation of equilibrium data. It is necessary to fit the equilibrium absorption data with different adsorption isotherms to analyze an absorption process (Banerjee et al., 2015). Hence, the more common isotherm models, Langmuir and Freundlich models were used in this study. The amount of methylene blue adsorption at equilibrium $q_e$ (mg/g) was calculated by using the mass balance equation:

$$q_e = \frac{(C_0 - C_e)V}{m}$$

where $C_0$ and $C_e$ are initial and equilibrium concentrations of MB (mg/L), respectively, V is volume of the solution (L), and m is the mass of adsorbent, GO/MgO NCs (g).

Figure 1A:
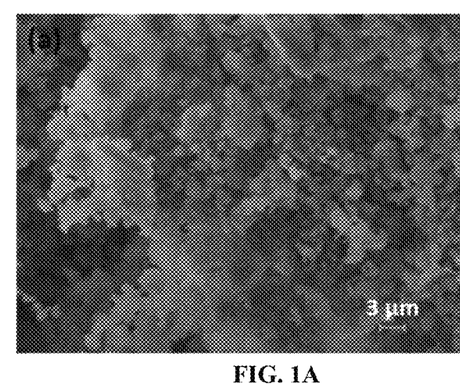
Figure 1B:
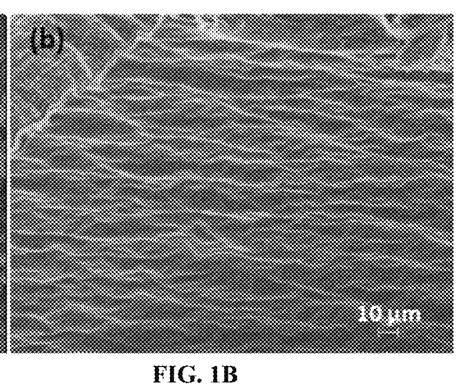
Figure 1C:
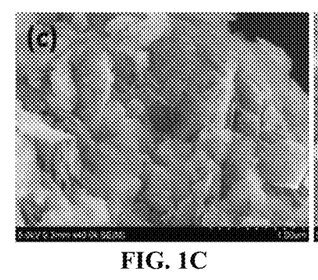
Figure 1D:
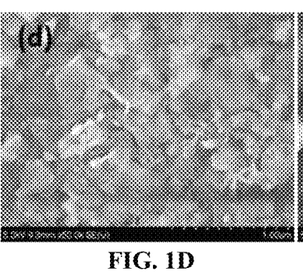
Figure 1E:
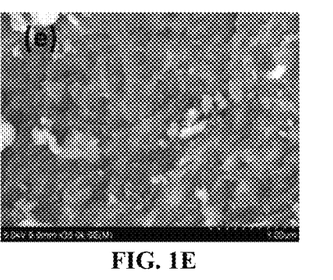

Characterization of GO, MgO, and GO/MgO NCs. The SEM images of GO, MgO and NCs are shown in FIGS. 1A to 1E. FIG. 1A shows that MgO powders are porous and agglomerated consistent with previous studies (Moussavi and Mahmoudi, 2009a, 2009b). GO that is obtained from modified Hummers method is shown in FIG. 1B, with a layer of wrinkled graphene oxide sheet at a low magnification. 3D nanostructures of GO/MgO NCs that are synthesized by sonication method are shown in FIGS. 1C, 1D and 1E, for the three different ratios of 1:5, 1:1 and 5:1, respectively, depicting that the surfaces of GO are covered by FIGS. 1A to 1E. SEM images: (FIG. 1A) MgO, (FIG. 1B) GO, and GO/MgO NCs for ratios (FIG. 1C) 1:5, (FIG. 1D) 1:1, and (FIG. 1E) 5:1

MgOs. Compared to GO/MgO NC 1:5 ratio, there are less amount of MgOs on GO surface in 1:1 and 5:1 ratios. It is evident from the SEM images that Mg particles were anchored heterogeneously on the GO sheets. GO sheet has leaf-like structure and a lot of agglomeration as well.

Figure 2A:
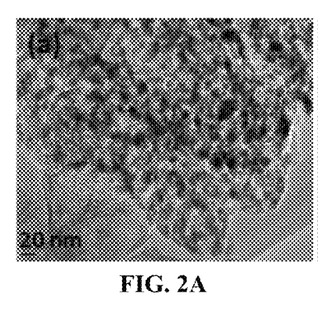
FIGS. 2A to 2C show TEM images for GO/MgO NCs for ratios (FIG. 2A) 1:5, (FIG. 2B) 1:1, and (FIG. 2C) 5:1.
Figure 2B:
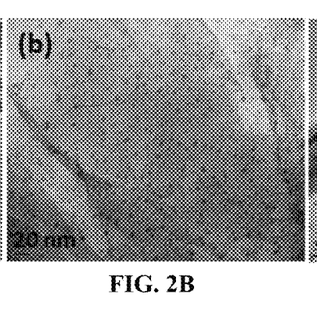
Figure 2C:
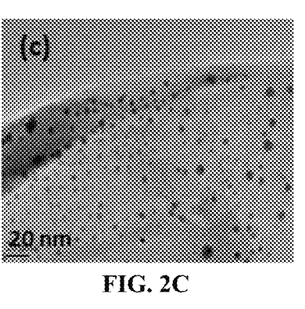

TEM images of MgO NPs distributed on the graphene oxide sheets are shown in FIGS. 2A-2C for the three different NC ratios. From the figures, it is obvious that MgO NPs are smaller than 20 nm. Similarly to SEM images, dispersion of MgO NPs on GO sheets is not completely uniform. It is also seen that these NPs are sitting tightly on GO nano-sheets.

Figure 3A:
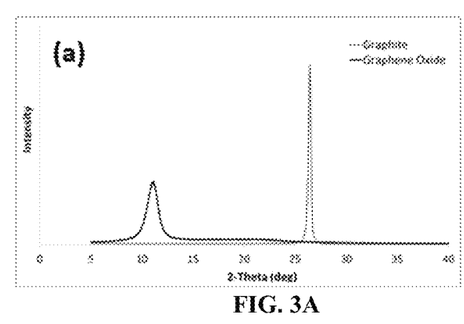
Figure 3B:
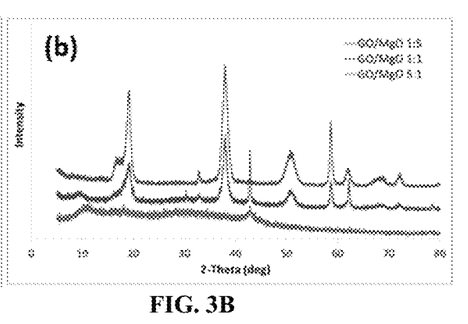

XRD patterns of graphite, GO, MgO, and GO/MgO NCs are shown in FIG. 3. As shown in FIG. 3A, the diffraction peak for graphite is at $2\theta=26.40°$ while, the diffraction peak for GO is at $2\theta=11.2°$. This change in the peak shows that the oxidation process decreases peak intensity and it demonstrates the typical loose-layer-like structure of GO. GO peak is due to the abundant oxygen-containing functional groups on the surface of GO (Becerril et al., 2008). The presence of GO, MgO, and $Mg(OH)_2$ in the NC powders is also seen. FIG. 3A and FIG. 3B shows XRD patterns: (FIG. 3A) Graphite and Graphene Oxide, (FIG. 3B) GO/MgO NCs for ratios 1:5, 1:1, and 5:1.

As shown in the FIG. 3B, the peaks positioned at $2\theta=36.8°$, $42.8°$, $62.3°$, $74.5°$, and $78.4°$ belong to MgO. Also, the diffraction peaks at the $2\theta$ value of $18.4°$, $32.8°$, $38.0°$, $50.9°$, $58.7°$, $68.4°$, and $72.1°$ are matched with $Mg(OH)_2$. $Mg(OH)_2$ was produced during modification of GO by MgO through sonication process in DI water. The diffraction peak for GO at $2\theta=11.2°$ were decreased as the ratio of MgO and $Mg(OH)_2$ were increased in the NCs and it almost disappeared in the GO/MgO 1:5 ratio.

Figure 4A:
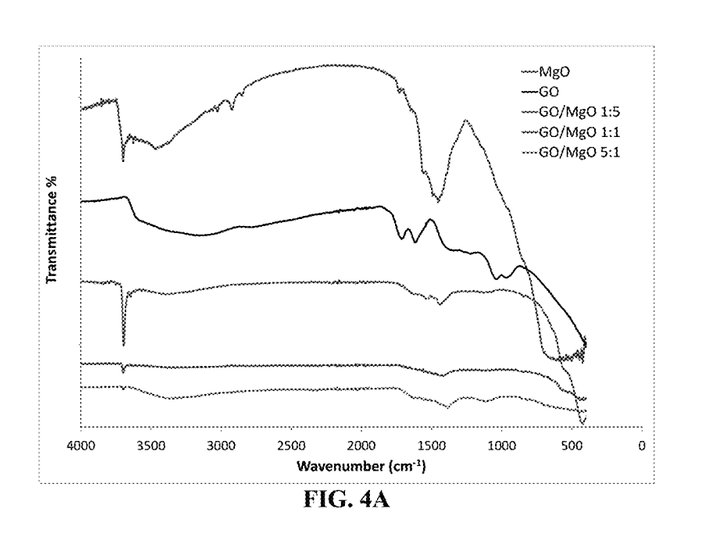
Figure 4B:
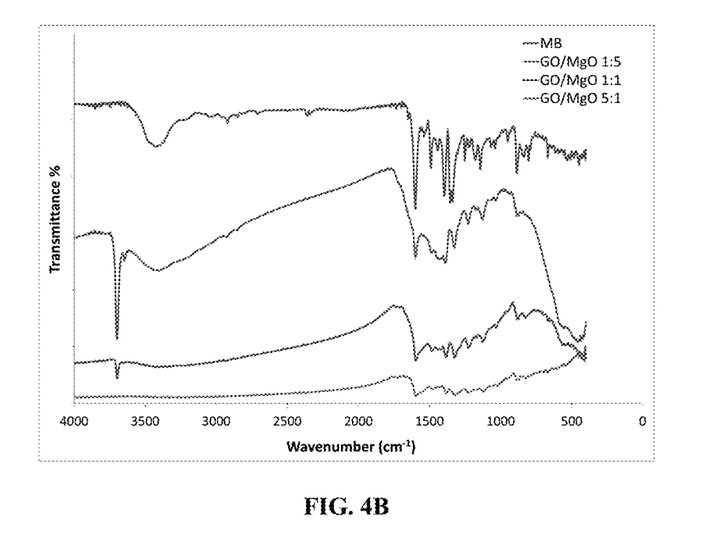

In order to investigate the functional groups of GO, MgO, MB, and GO/MgO NCs, FTIR spectroscopy was used in the wave number range of 4000-400 $cm^{-1}$ and the results are shown in FIGS. 4A and 4B. In FIG. 4A, the sharp peak around 3700 $cm^{-1}$ on MgO and GO/MgO NCs is related to the presence of hydroxyl groups. For MgO NPs, the hydroxyl group comes from the reaction between the surface of MgO NPs with water vapor in air or defects (Kumar and Kumar, 2008). The intensity of this peak decreases with decrease of Mg ratio in GO/MgO NCs. For GO and GO/MgO NCs, the broad band in the range of 3100-3500 $cm^{-1}$ is assigned to the appearance of the stretching of O—H (Tayyebi et al., 2015a). The FTIR of GO is in a good agreement with other reported studies (Fan et al., 2012; Tang et al., 2013; Tayyebi et al., 2015b). The peaks at 1730 $cm^{-1}$ and 1630 $cm^{-1}$ correspond to C=O and C=C stretching. The band located at 1388 $cm^{-1}$ and 1068 $cm^{-1}$ are assigned to C—OH stretching and C—O—C stretching vibrations mode of sp2 carbon skeletal, respectively. FIG. 4B shows the infrared spectra of the MB and GO/MgO NCs after adsorption. For MB, peaks detected at 1604 $cm^{-1}$ and 1494 $cm^{-1}$ can be attributed to the aromatic rings stretching vibrations, at 1400 $cm^{-1}$ belongs to C—N stretching, and at 1358 $cm^{-1}$ reflect —$CH_3$ symmetric deformation (Ma et al., 2016). Similar bands were popped up in the infrared spectra of GO/MgO NCs after adsorption with some shift from 1604 $cm^{-1}$ to 1594 $cm^{-1}$ for GO/MgO 1:5 ratio, and to 1589 $cm^{-1}$ for GO/MgO 1:1 and 5:1 ratios. Also, the peak at 1794 $cm^{-1}$ shifted to around 1488 after adsorption for all ratios. Similar results are reported previously (Ma et al., 2016). These shifting bands for aromatic rings suggest that there may be π-π interaction between aromatic rings of MB and the GO/MgO NCs. For GO/MgO NCs after adsorption, it is seen that the sharp peak around 3700 $cm^{-1}$ disappeared in GO/MgO 5:1 ratio and become sharper with increasing ratio of MgO NPs in the NC powders.

Figure 5A:
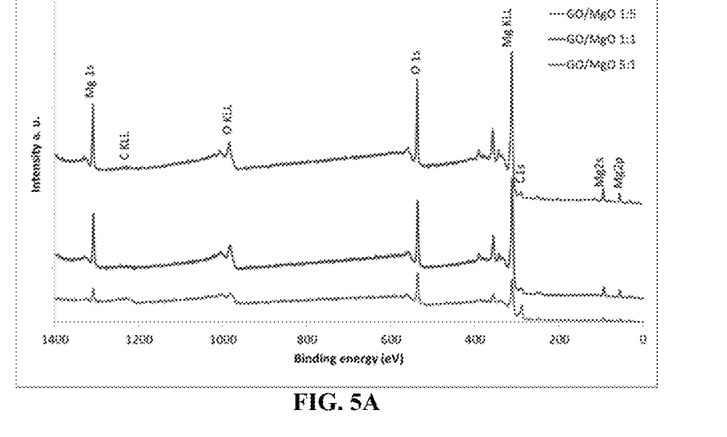
FIGS. 5A and 5B show the XPS spectrum of GO/MgO NCs (FIG. 5A) before and (FIG. 5B) after adsorption.
Figure 5B:
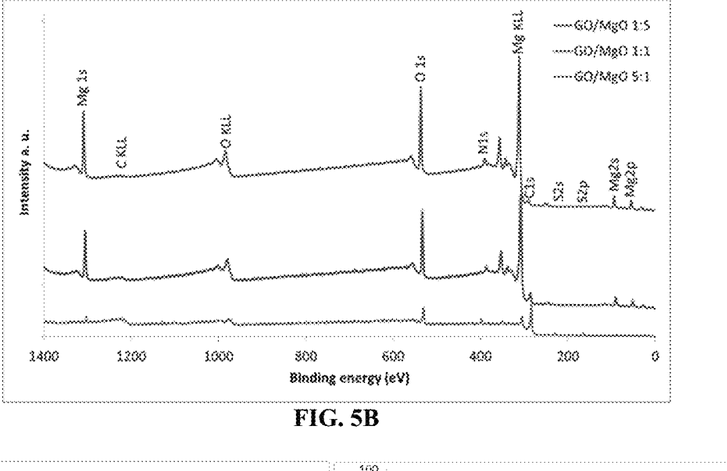

The full scan XPS spectrum of GO/MgO NCs before and after adsorption of MB is given in FIGS. 5A and 5B. As it is shown in FIG. 5A, similar to FTIR results, the intensity of the Mg peaks (Mg 1s, Mg KLL, Mg 2S, and Mg 2p) increases with the increase of Mg ratio in the NCs, whereas the intensity of C peaks (C KLL and C1s) decreases. After adsorption of MB on the NCs, there are new peaks for S and N, which correspond to MB as shown in FIG. 5B.

Dye Adsorption. Adsorption of MB by GO/MgO NCs was investigated under different experimental conditions: GO/MgO NCs dosage, contact time, and initial MB concentration. The effect of each of these variables are described in detail below.

Figure 6A:
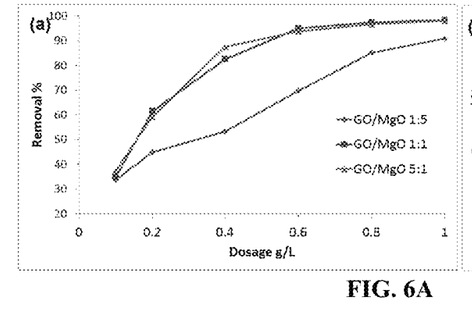

Effect of GO/MgO dosage. The effect of GO/MgO dosage (0.1-1 g/L) on the removal of MB (20 mg/L) was studied at pH of 7. The remaining dye concentration was measured after 20 minutes of stirring the suspension on the magnetic stirrer. The results showed that for all GO/MgO ratios, the efficiency of adsorption increased by the increase of GO/MgO NCs dosage (FIG. 6A), which is due to the increase in the availability of adsorbent surface area and active sites provided at higher dosage (Moussavi and Mahmoudi, 2009a; Wu et al., 2013). According to FIG. 6A, optimum adsorbent dosages for adsorbing 20 mg/L of MB were chosen as follows: 1 g/L for GO/MgO 1:5 ratio; 0.6 g/L for GO/MgO 1:1 ratio; and 0.6 g/L for GO/MgO 1:1 ratio. These dosages were used in the following studies.

Figure 6B:
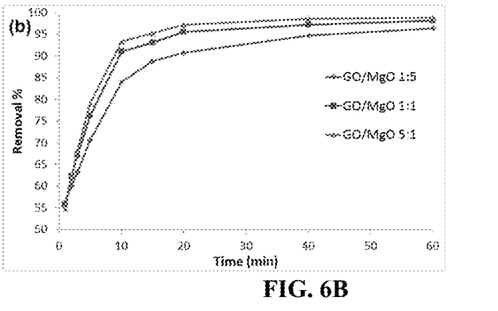

Effect of contact time. The effect of contact time on the adsorption of MB on GO/MgO NCs was investigated in the range of 1-60 minutes for the removal of 20 mg/L MB concentration at pH 7. FIG. 6B shows that the MB removal percentage increased quickly with the increase of contact time. It can be seen that the adsorption of MB onto GO/MgO NCs increased rapidly in the first 10 minutes, then increased slowly. More than 55% of the dye was removed in the first minute for all ratios, which could be due to the high number of available adsorption sites at the beginning of the adsorption process, which then later became saturated. According to the results seen in FIG. 6B, at a certain selected time GO/MgO NC with 5:1 ratio had the highest removal percentage, whereas the NC with 1:5 had the lowest value. Although, the removal efficiency of NC with 1:1 ratio was higher than the 1:5 ratio, it was still slightly lower than the NC with 5:1 ratio. The results showed that for all GO/MgO NCs ratios, almost all of the MB dye was removed in 20 minutes, and after, that there was not significant increase in adsorption efficiency of MB by the NCs. Hence, 20 minute contact time was chosen as the optimum time for the experiments to study the effect of initial MB concentration.

Figure 6C:
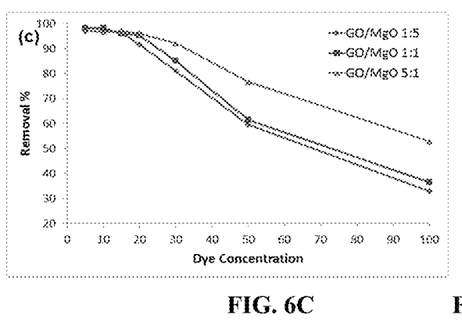
Figure 6D:
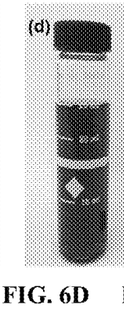
(FIG. 6D) addition of the synthesized GO/MgO NC material separating GO from water by precipitating to the bottom of the tube.
Figure 6E:
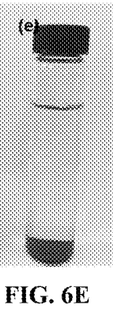
(FIG. 6E) before and (FIG. 6G) after treatment of 20 mg/L MB solution in water by GO/MgO NC material after 20 minutes contact time at pH 7.
Figure 6F:
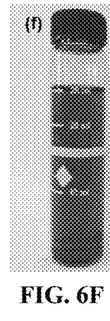
Figure 6G:
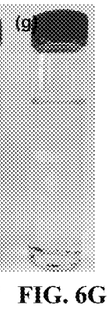

Effect of initial concentration of MB. Since MB is used in different industries, they produce wastewater by different amount of dye concentrations. It is thus important to study the adsorption efficiency of GO/MgO NCs for different initial MB concentrations. In this study, MB concentrations in the range of 5-100 mg/L were prepared and the performance of dye removal was studied at pH of 7 after 20 minutes. As shown in FIG. 6C, almost all of the 5, 10, 15, and 20 mg/L initial concentrations were removed in 20 minutes for all GO/MgO NC ratios. After 20 mg/L concentration, efficiency of adsorption decreased gradually. GO/MgO 5:1 ratio NC had the highest capability for removal of MB compared to other ratios, where the adsorption efficiencies for initial concentrations of MB at 30, 50, and 100 mg/L were 92%, 77%, and 53%, respectively. On the other hand, the NC 1:5 ratio had the lowest efficiency for MB removal with the observed adsorption efficiencies of 81%, 59% and 33%, for initial MB concentrations of 30, 50, and 100 mg/L, respectively. The efficiency of MB removal by the NC with 1:1 ratio was remarkably less than the 5:1 ratio, but so close to 1:5 ratio, where the removal efficiencies for these last two ratios were not noticeable. The results therefore indicated that the initial dye concentration significantly affected the MB removal efficiency onto the GO/MgO NCs and the adsorption of MB was mainly occurring onto the GO sites compared to the MgO sites. Similar results were obtained Li et al. (2011) for superior adsorption ability of GO compared to Mg(OH)$_2$. FIG. 6D and FIG. 6E illustrate the comparative behavior of GO and GO/MgO NCs in water. Although GO is completely dispersed in water (FIG. 6D), the inventors synthesized GO/MgO NCs easily separate GO from water by precipitating to the bottom of the tube (FIG. 6E). An illustration of a water sample with 20 mg/l MB dye concentration before (FIG. 6F) and after treatment with GO/MgO NCs (FIG. 6C) is also shown. Therefore, the novel GO/MgO NC is a successful composition to render the GO to be easily settled in aqueous solutions and it can be used for the successful removal of organic dyes such as MB.

Adsorption Isotherms, Effect of pH and Adsorption Mechanism. Adsorption isotherms were studied to determine the adsorption mechanisms. Among all isotherm models, Langmuir and Freundlich equations are the most commonly used (Azar et al., 2016).

The Longmuir model is based on the assumption that adsorption is a monolayer adsorption on a homogenous surface of adsorbent, and is described as:

$$\frac{C_e}{q_e} = \frac{C_e}{q_m} + \frac{1}{q_m K_l}$$

where $C_e$ (mg/L) is the equilibrium concentration of MB, $q_e$ (mg/g) is the amount of MB adsorbed per unit weight of GO/MgO NCs, $q_m$ (mg/g) is the maximum theoretical MB adsorbed, and $K_L$ (L/mg) is the Longmuir constant related to the affinity of binding sites. The Langmuir isotherm plots $C_e/q_e$ versus $C_e$, are used to calculate the $q_m$ and $K_l$ values from the slopes and intercepts of the plots.

The Freundlich model is based on the assumption of multilayer adsorption on adsorbent, and is described as:

$$\log q_e = \log k_f + \frac{1}{n} \log C_e$$

where $k_f$ (mg/g) and n are the Freundlich constants indicating the capacity of the adsorbent for the adsorbate and strength of adsorption, respectively. The Freundlich isotherm plots log $q_e$ versus log $C_e$, are used to calculate the $k_f$ and n values.

Figure 7A:
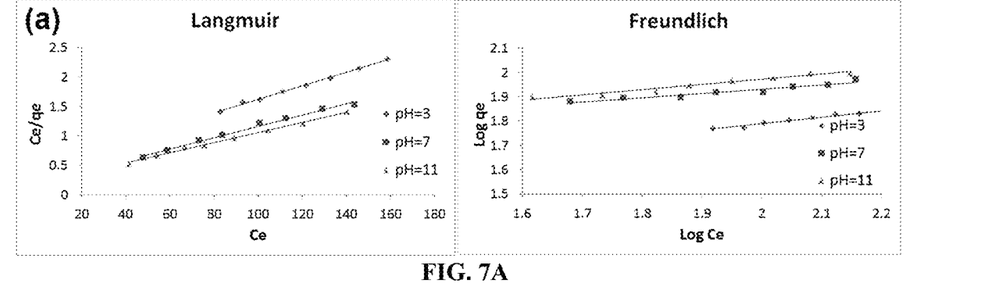
Figure 7B:
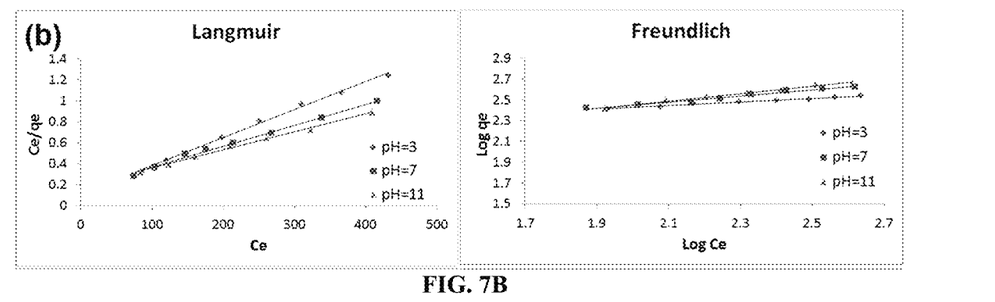
Figure 7C:
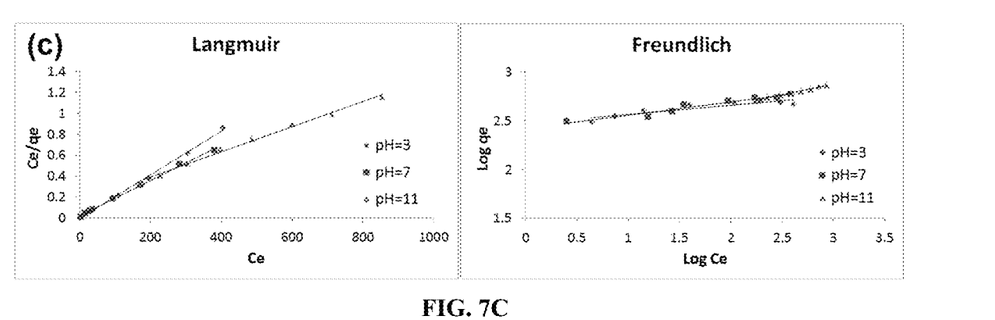

The fitted results for the Longmuir and Freundlich isotherms are shown in FIGS. 7A to 7C. Table 1 shows the parameters of Langmuir and Freundlich adsorption isotherms for MB

TABLE 1

Langmuir and Freundlich isotherm parameters for MB sorption onto GO/MgO NCs with ratios 1:5, 1:1, and 5:1 in different pH values of 3, 7 and 11.

| GO/MgO Ratio | pH | Initial Concentration (mg/L) | Langmuir | | | Freundlich | | |
|---|---|---|---|---|---|---|---|---|
| | | | $q_m$ (mg/g) | $k_L$ (L/g) | $R^2$ | n | $k_f$(L/g) | $R^2$ |
| 1:5 | 3 | 200 | 87 | 0.024 | 0.9979 | 3.77 | 18.14 | 0.9752 |
| | 7 | 200 | 104 | 0.048 | 0.9908 | 5.71 | 38.11 | 0.9215 |
| | 11 | 200 | 114 | 0.045 | 0.9959 | 4.69 | 35.18 | 0.9571 |
| 1:1 | 3 | 500 | 370 | 0.022 | 0.9970 | 5.7 | 120.61 | 0.9766 |
| | 7 | 500 | 500 | 0.012 | 0.9916 | 3.45 | 74.15 | 0.9662 |
| | 11 | 500 | 588 | 0.009 | 0.9953 | 2.76 | 53.38 | 0.9897 |
| 5:1 | 3 | 500 | 476 | 4.2 | 0.9985 | 10.66 | 297.37 | 0.8242 |
| | 7 | 500 | 588 | 0.090 | 0.9973 | 7.37 | 264.12 | 0.9378 |
| | 11 | 1000 | 833 | 0.007 | 0.9944 | 4.5 | 163.72 | 0.9868 |

Figure 9:
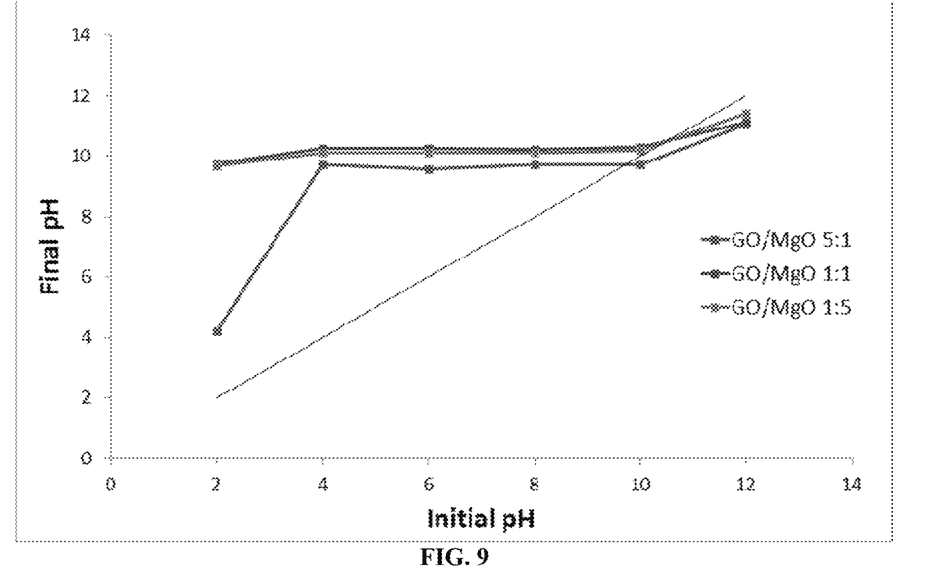
FIG. 9 is a graph that shows the determination of $pH_{pzc}$ of GO/MgO NCs by the pH drift method for the different ratios of 1:5, 1:1, and 5:1.

Adsorption onto GO/MgO NCs with the three different NC ratios in three different pH values. As seen from Table 1, the correlation coefficients ($R^2$) of the Langmuir isotherms are greater than the ones calculated by Freundlich isotherms for all ratios, indicating that the adsorption of MB onto GO/MgO NCs would take place in a monolayer adsorption. The maximum adsorption capacity, $q_m$, of the MB onto GO/MgO NCs, for all ratios in different pHs is given in Table 2. Maximum adsorption capacity for GO/MgO is observed to be the highest for 5:1 ratio, whereas the GO/MgO 1:5 ratio had the lowest amount of adsorption capacity. The maximum adsorption capacity for NC with 1:1 ratio was higher than 1:5, but lower than 5:1 ratio. These results show that the efficiency of adsorption of MB was dependent on solution pH. FIGS. 7A to 7C presents the influence of the initial pH of the solution on the adsorption of MB onto GO/MgO NCs in the pH ranges of 3.0, 7.0, and 11.0. According to the results, the highest and the lowest adsorption capacity of the MB with FIGS. 7A to 7B shows the adsorption isotherms of MB on GO/MgO NCs for ratios (FIG. 7A) 1:5, (FIG. 7B) 1:1, and (FIG. 7C) 5:1 with different pH values of 3, 7 and 11. GO/MgO NCs belongs to pH 11.0 and pH 3.0, respectively. For better understanding of the pH effect, the pH of point of zero charge ($pH_{pzc}$) of GO/MgO NCs was determined according to the pH drift procedure (Al-Degs et al., 2008), where the $pH_{pzc}$ for GO/MgO ratios 5:1, 1:1, and 1:5 were determined to be ~9.7, 10.5, and 10.5, respectively (FIG. 9). At pH below $pH_{pzc}$, the GO/MgO NCs surface has a positive charge and at pH above $pH_{pzc}$, the surface has a negative charge. Therefore, electrostatic attraction can be the dominant mechanism of adsorption between GO/MgO NCs and MB when pH is above $pH_{pzc}$. For pH values below $pH_{pzc}$, other adsorption mechanisms such as hydrogen bonding (Al-Degs et al., 2008) and π-π interaction (Wu et al., 2011) may attribute to the adsorption. Comparably, the same pH-regulated behavior were observed in different studies on MB (Ai et al., 2011; Deng et al., 2013; Ramesha et al., 2011; Yang et al., 2011).

TABLE 2

Comparative summary of MB adsorption by various GO-based adsorbents.

| Adsorbent | $q_e$ (mg/g) | Reference |
|---|---|---|
| GCNT | 81.97 | 2 |
| Graphene | 153.85 | 7 |
| EGO | 17.3 | 13 |
| GO | 243.9 | 15 |
| GO/chitosan | 175.4 | 42 |
| GO | 714 | 61 |
| GO | 43.5 | 62 |
| MCGO | 95.16 | 62 |
| GO/MgO 1:5 | 114 | This study |
| GO/MgO 1:1 | 588 | This study |
| GO/MgO 5:1 | 833 | This study |

A comparative summary of the adsorption capacities of the various GO-based adsorbents reported in the literature for the removal of MB is given in Table 2. It is seen that the adsorption capacity of the GO/MgO is greatest for 5:1 ratio (833 mg/g) compared to other ratios tested in this study (588 mg/g for 1:1 ratio and 114 mg/g for 1:5 ratio), as well as compared to other graphene based composite adsorbents listed for MB removal, as to the authors' knowledge This high adsorption capacity shows that GO/MgO NCs are promising and applicable adsorbents for the efficient removal of MB from contaminated wastewaters.

Figure 8A:
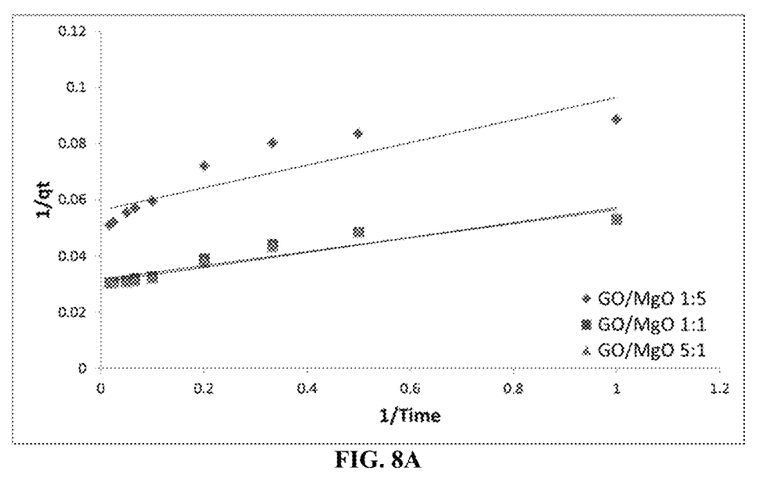
FIG. 8A is a graph that shows pseudo-first order kinetics.
Figure 8B:
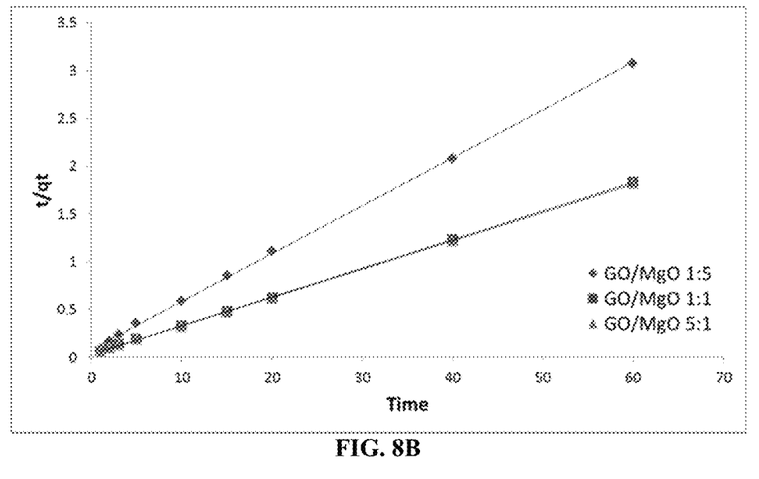
FIG. 8B is a graph that shows pseudo-second order kinetics for adsorption of MB by GO/MgO NCs.

Kinetics Studies. In order to investigate the mechanism of the adsorption process, two most common kinetic models: pseudo-first-order equation and pseudo-second-order equation were employed to analyze the experimental data for all GO/MgO ratios at an initial concentration of 20 mg/L MB. FIGS. 8A and 8B present the adsorption kinetics of MB onto GO/MgO NCs using the two models. The pseudo-first order equation (Toor and Jin, 2012) is represented as:

$$\frac{1}{q_t} = \frac{k_1}{q_e t} + \frac{1}{q_e}$$

where $q_e$ (mg/g) and $q_t$ (mg/g) are the amounts of MB adsorbed on GO/MgO NCs at equilibrium and at time t, respectively, and k (1/min) is the pseudo-first-order constant. The parameters values of the kinetic models are given in Table 3. The results show that the experimental $q_e$ is not close to the calculated $q_e$ and the coefficient of determination $R^2$ is low indicating a poor fit with pseudo-first-order kinetic model.

The pseudo-second-order equation (Behnamfard and Salarirad, 2009) is expressed as:

$$\frac{t}{q_t} = \frac{1}{k_2 q_e^2} + \frac{t}{q_e}$$

where $k_2$ (g/mol min) is the equilibrium rate constant of pseudo-second-order equation. As seen in Table 3, the coefficient of determination $R^2$ in pseudo-second-order model is greater than 0.999 in all GO/MgO NC ratios. Also, the experimental $q_e$ is close to the calculated $q_e$, illustrating a strong pseudo-second-order model fit for the MB adsorption onto the GO/MgO NCs tested in this study.

TABLE 3

Pseudo-first order and pseudo-second order adsorption constants:

| GO/MgO Ratio | $q_{e, exp}$ (mg/g) | pseudo-first order model | | | pseudo-second order model | | |
|---|---|---|---|---|---|---|---|
| | | $q_{e, cal}$ (mg/g) | $k_1$ (1/min) | $R^2$ | $q_{e, cal}$ (mg/g) | $k_2$ (1/min) | $R^2$ |
| 1:5 | 21 | 7.39 | 0.0163 | 0.8821 | 20 | 0.0029 | 0.9995 |
| 1:1 | 34 | 9.26 | 0.0183 | 0.7474 | 33.67 | 0.0290 | 0.9998 |
| 5:1 | 34 | 8.29 | 0.0196 | 0.6895 | 33.44 | 0.0259 | 0.9998 |

The present invention includes the synthesis of novel GO/MgO NCs and its application for MB removal in aqueous solutions. The efficiency of adsorption is observed to increase by the increase of GO/MgO NC dosage. The NCs have higher adsorption capacity than any of other graphene-based composite materials reported so far (833 mg/g for 5:1 ratio, based on Langmuir adsorption model). Almost all of concentrations tested in the range of 5-100 mg/L were removed in 20 minutes. The results showed that the adsorption of MB was mainly occurring onto the GO sites compared to the MgO sites. The synthesized NC is also a successful composition, which can easily separate from solution after treatment. Therefore, the novel GO/MgO NCs are adsorbents for the successful removal of other pollutants from water and wastewater.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

Ai, L., Zhang, C., Chen, Z., 2011. Removal of methylene blue from aqueous solution by a solvothermal-synthesized graphene/magnetite composite. J. Hazard. Mater. 192, 1515-1524. doi:10.1016/j.jhazmat.2011.06.068

Al-Degs, Y. S., El-Barghouthi, M. I., El-Sheikh, A. H., Walker, G. M., 2008. Effect of solution pH, ionic strength, and temperature on adsorption behavior of reactive dyes on activated carbon. Dyes Pigments 77, 16-23. doi:10.1016/j.dyepig.2007.03.001

Allen, M. J., Tung, V. C., Kaner, R. B., 2010. Honeycomb Carbon: A Review of Graphene. Chem. Rev. 110, 132-145. doi:10.1021/cr900070d Apul, O. G., Wang, Q., Zhou, Y., Karanfil, T., 2013. Adsorption of aromatic organic contaminants by graphene nanosheets: Comparison with carbon nanotubes and activated carbon. Water Res. 47, 1648-1654. doi:10.1016/j.watres.2012.12.031

Azar, M. T., Leili, M., Taherkhani, F., Bhatnagar, A., 2016. A comparative study for the removal of aniline from aqueous solutions using modified bentonite and activated carbon. Desalination Water Treat Banerjee, P., Sau, S., Das, P., Mukhopadhayay, A., 2015. Optimization and modelling of synthetic azo dye wastewater treatment using Graphene oxide nanoplatelets: Characterization toxicity evaluation and optimization using Artificial Neural Network. Ecotoxicol. Environ. Saf. 119, 47-57. doi:10.1016/j.ecoenv.2015.04.022

Becerril, H. A., Mao, J., Liu, Z., Stoltenberg, R. M., Bao, Z., Chen, Y., 2008. Evaluation of Solution-Processed Reduced Graphene Oxide Films as Transparent Conductors. ACS Nano 2, 463-470. doi:10.1021/nn700375n Behnamfard, A., Salarirad, M. M., 2009. Equilibrium and kinetic studies on free cyanide adsorption from aqueous solution by activated carbon. J. Hazard. Mater. 170, 127-133. doi:10.1016/j.jhazmat.2009.04.124

Deng, J.-H., Zhang, X.-R., Zeng, G.-M., Gong, J.-L., Niu, Q.-Y., Liang, J., 2013. Simultaneous removal of Cd(II) and ionic dyes from aqueous solution using magnetic graphene oxide nanocomposite as an adsorbent. Chem. Eng. J. 226, 189-200. doi:10.1016/j.cej.2013.04.045

Fan, L., Luo, C., Li, X., Lu, F., Qiu, H., Sun, M., 2012. Fabrication of novel magnetic chitosan grafted with graphene oxide to enhance adsorption properties for methyl blue. J. Hazard. Mater. 215-216, 272-279. doi:10.1016/j.jhazmat.2012.02.068

Gómez-Pastora, J., Bringas, E., Ortiz, I., 2014. Recent progress and future challenges on the use of high performance magnetic nano-adsorbents in environmental applications. Chem. Eng. J. 256, 187-204. doi:10.1016/j.cej.2014.06.119

Hamadanian, M., Akbari, A., Jabbari, V., 2011. Electrospun titanium dioxide nanofibers: Fabrication, properties and its application in photo-oxidative degradation of methyl orange (MO). Fibers Polym. 12, 880-885. doi:10.1007/s12221-011-0880-z Hamadanian, M., Jabbari, V., Shamshiri, M., Asad, M., Mutlay, I., 2013. Preparation of novel hetero-nanostructures and high efficient visible light-active photocatalyst using incorporation of CNT as an electron-transfer channel into the support TiO2 and PbS. J. Taiwan Inst. Chem. Eng. 44, 748-757. doi:10.1016/j.jtice.2013.01.018

Jiang, G., Lin, Z., Chen, C., Zhu, L., Chang, Q., Wang, N., Wei, W., Tang, H., 2011. TiO2 nanoparticles assembled on graphene oxide nanosheets with high photocatalytic activity for removal of pollutants. Carbon 49, 2693-2701. doi:10.1016/j.carbon.2011.02.059

Kumar, A., Kumar, J., 2008. On the synthesis and optical absorption studies of nano-size magnesium oxide powder. J. Phys. Chem. Solids 69, 2764-2772. doi:10.1016/j.jpcs.2008.06.143

Li, B., Cao, H., Yin, G., 2011. Mg(OH)2@reduced graphene oxide composite for removal of dyes from water. J. Mater. Chem. 21, 13765. doi:10.1039/c1jm13368c Li, L.-X., Xu, D., Li, X.-Q., Liu, W.-C., Jia, Y., 2014. Excellent fluoride removal properties of porous hollow MgO microspheres. New J Chem 38, 5445-5452. doi:10.1039/C4NJ01361A Liu, M., Xu, J., Cheng, B., Ho, W., Yu, J., 2015. Synthesis and adsorption performance of Mg(OH)2 hexagonal nanosheet-graphene oxide composites. Appl. Surf. Sci. 332, 121-129. doi:10.1016/j.apsusc.2015.01.121

Ma, J., Zhang, Z., Yang, M., Wu, Y., Feng, X., Liu, L., Zhang, X., Tong, Z., 2016. Intercalated methylene blue between calcium niobate nanosheets by ESD technique for electrocatalytic oxidation of ascorbic acid. Microporous Mesoporous Mater. 221, 123-127. doi:10.1016/j.micromeso.2015.09.030

Mishakov, I. V., Bedilo, A. F., Richards, R. M., Chesnokov, V. V., Volodin, A. M., Zaikovskii, V. I., Buyanov, R. A., Klabunde, K. J., 2002. Nanocrystalline MgO as a Dehydrohalogenation Catalyst. J. Catal. 206, 40-48. doi:10.1006/jcat.2001.3474

Moussavi, G., Hossaini, Z., Pourakbar, M., 2016. High-rate adsorption of acetaminophen from the contaminated water onto double-oxidized graphene oxide. Chem. Eng. J. 287, 665-673. doi:10.1016/j.cej.2015.11.025

Moussavi, G., khavanin, A., Alizadeh, R., 2010. The integration of ozonation catalyzed with MgO nanocrystals and the biodegradation for the removal of phenol from saline wastewater. Appl. Catal. B Environ. 97, 160-167. doi:10.1016/j.apcatb.2010.03.036

Moussavi, G., Mahmoudi, M., 2009a. Removal of azo and anthraquinone reactive dyes from industrial wastewaters using MgO nanoparticles. J. Hazard. Mater. 168, 806-812. doi: 10.1016/j.jhazmat.2009.02.097

Moussavi, G., Mahmoudi, M., 2009b. Degradation and biodegradability improvement of the reactive red 198 azo dye using catalytic ozonation with MgO nanocrystals. Chem. Eng. J. 152, 1-7. doi:10.1016/j.cej.2009.03.014

Moussavi, G., Yazdanbakhsh, A., Heidarizad, M., 2009. The removal of formaldehyde from concentrated synthetic wastewater using O3/MgO/H2O2 process integrated with the biological treatment. J. Hazard. Mater. 171, 907-913. doi:10.1016/j.jhazmat.2009.06.090

Qu, X., Brame, J., Li, Q., Alvarez, P. J. J., 2013. Nanotechnology for a Safe and Sustainable Water Supply: Enabling Integrated Water Treatment and Reuse. Acc. Chem. Res. 46, 834-843. doi:10.1021/ar300029v Rafatullah, M., Sulaiman, O., Hashim, R., Ahmad, A., 2010. Adsorption of methylene blue on low-cost adsorbents: A review. J. Hazard. Mater. 177, 70-80. doi:10.1016/j.jhazmat.2009.12.047

Ramesha, G. K., Vijaya Kumara, A., Muralidhara, H. B., Sampath, S., 2011. Graphene and graphene oxide as effective adsorbents toward anionic and cationic dyes. J. Colloid Interface Sci. 361, 270-277. doi:10.1016/j.jcis.2011.05.050

Robinson, T., McMullan, G., Marchant, R., Nigam, P., 2001. Remediation of dyes in textile effluent: a critical review on current treatment technologies with a proposed alternative. Bioresour. Technol. 77, 247-255. doi:10.1016/S0960-8524(00)00080-8

Roy-Mayhew, J. D., Bozym, D. J., Punckt, C., Aksay, I. A., 2010. Functionalized Graphene as a Catalytic Counter Electrode in Dye-Sensitized Solar Cells. ACS Nano 4, 6203-6211. doi:10.1021/nn1016428

Schwierz, F., 2010. Graphene transistors. Nat. Nanotechnol. 5, 487-496. doi:10.1038/nnano.2010.89

Sharma, P., Saikia, B. K., Das, M. R., 2014. Removal of methyl green dye molecule from aqueous system using reduced graphene oxide as an efficient adsorbent: Kinetics, isotherm and thermodynamic parameters. Colloids Surf. Physicochem. Eng. Asp. 457, 125-133. doi:10.1016/j.colsurfa.2014.05.054

Tang, Y., Guo, H., Xiao, L., Yu, S., Gao, N., Wang, Y., 2013. Synthesis of reduced graphene oxide/magnetite composites and investigation of their adsorption performance of fluoroquinolone antibiotics. Colloids Surf. Physicochem. Eng. Asp. 424, 74-80. doi:10.1016/j.colsurfa.2013.02.030

Tavakoli, M. M., Tayyebi, A., Simchi, A., Aashuri, H., Outokesh, M., Fan, Z., 2015. Physicochemical properties of hybrid graphene-lead sulfide quantum dots prepared by supercritical ethanol. J. Nanoparticle Res. 17, 1-13. doi: 10.1007/s11051-014-2854-8

Tayyebi, A., Outokesh, M., Moradi, S., Doram, A., 2015a. Synthesis and characterization of ultrasound assisted "graphene oxide-magnetite" hybrid, and investigation of its adsorption properties for Sr(II) and Co(II) ions. Appl. Surf. Sci. 353, 350-362. doi:10.1016/j.apsusc.2015.06.087

Tayyebi, A., Tavakoli, M. M., Outokesh, M., Shafiekhani, A., Simchi, A. (Arash), 2015b. Supercritical Synthesis and Characterization of Graphene—PbS Quantum Dots Composite with Enhanced Photovoltaic Properties. Ind. Eng. Chem. Res. 54, 7382-7392. doi:10.1021/acs.iecr.5b00008

Tiwari, J. N., Mahesh, K., Le, N. H., Kemp, K. C., Timilsina, R., Tiwari, R. N., Kim, K. S., 2013. Reduced graphene oxide-based hydrogels for the efficient capture of dye pollutants from aqueous solutions. Carbon 56, 173-182. doi:10.1016/j.carbon.2013.01.001

Toor, M., Jin, B., 2012. Adsorption characteristics, isotherm, kinetics, and diffusion of modified natural bentonite for removing diazo dye. Chem. Eng. J. 187, 79-88. doi: 10.1016/j.cej.2012.01.089

Van der Zee, F. P., Villaverde, S., 2005. Combined anaerobic-aerobic treatment of azo dyes—A short review of bioreactor studies. Water Res. 39, 1425-1440. doi: 10.1016/j.watres.2005.03.007

Wang, C., Feng, C., Gao, Y., Ma, X., Wu, Q., Wang, Z., 2011. Preparation of a graphene-based magnetic nanocomposite for the removal of an organic dye from aqueous solution. Chem. Eng. J. 173, 92-97. doi:10.1016/j.cej.2011.07.041

Wang, S., Sun, H., Ang, H. M., Tadé, M. O., 2013. Adsorptive remediation of environmental pollutants using novel graphene-based nanomaterials. Chem. Eng. J. 226, 336-347. doi: 10.1016/j.cej 0.2013.04.070

Wu, T., Cai, X., Tan, S., Li, H., Liu, J., Yang, W., 2011. Adsorption characteristics of acrylonitrile, p-toluenesulfonic acid, 1-naphthalenesulfonic acid and methyl blue on graphene in aqueous solutions. Chem. Eng. J. 173, 144-149. doi:10.1016/j.cej.2011.07.050

Wu, Y., Luo, H., Wang, H., Wang, C., Zhang, J., Zhang, Z., 2013. Adsorption of hexavalent chromium from aqueous solutions by graphene modified with cetyltrimethylammonium bromide. J. Colloid Interface Sci. 394, 183-191. doi:10.1016/j.jcis.2012.11.049

Yang, S.-T., Chen, S., Chang, Y., Cao, A., Liu, Y., Wang, H., 2011. Removal of methylene blue from aqueous solution by graphene oxide. J. Colloid Interface Sci. 359, 24-29. doi:10.1016/j.jcis.2011.02.064

Yang, Z., Yan, H., Yang, H., Li, H., Li, A., Cheng, R., 2013. Flocculation performance and mechanism of graphene oxide for removal of various contaminants from water. Water Res. 47, 3037-3046. doi: 10.1016/j.watres.2013.03.027

Zhu, J., Wei, S., Gu, H., Rapole, S. B., Wang, Q., Luo, Z., Haldolaarachchige, N., Young, D. P., Guo, Z., 2012. One-Pot Synthesis of Magnetic Graphene Nanocomposites Decorated with Core@Double-shell Nanoparticles for Fast Chromium Removal. Environ. Sci. Technol. 46, 977-985. doi:10.1021/es2014133

What is claimed is:

1. A composition for the removal of waste from a wastewater or a waste stream comprising:
    a composite comprising graphene oxide sheets and magnesium oxide nanoparticles at a ratio of 10:1 to 5:1 weight to weight, and having X-ray diffraction peaks at $2\theta=36.8°$, $42.8°$, $62.3°$, $74.5°$, and $78.4°$.

2. The composition of claim 1, wherein the composition is a nanocomposite.

3. The composition of claim 2, wherein the nanocomposite has an adsorption capacity for methylene blue of 833 mg methylene blue/g nanocomposite.

4. The composition of claim 1, wherein the composite settles in aqueous solutions.

5. The composition of claim 1, wherein the composite removes organic molecules from water.

6. The composition of claim 1, wherein the composite is formed by sonication of a solution of water comprising graphene oxide and magnesium oxide.

7. The composition of claim 1, wherein the composite is impregnated in or on a substrate.

* * * * *